(12) United States Patent
Sebastian et al.

(10) Patent No.: US 10,355,984 B2
(45) Date of Patent: Jul. 16, 2019

(54) AUTOMATIC RE-ROUTING OF NETWORK TRAFFIC IN A SOFTWARE-DEFINED NETWORK

(71) Applicant: HEWLETT PACKARD ENTERPRISE DEVELOPMENT LP, Houston, TX (US)

(72) Inventors: Celestian K Sebastian, Karnataka (IN); Saro Chandra Bhooshan Thazhath Veettil, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 81 days.

(21) Appl. No.: 15/316,795

(22) PCT Filed: Oct. 30, 2014

(86) PCT No.: PCT/US2014/063195
§ 371 (c)(1),
(2) Date: Dec. 6, 2016

(87) PCT Pub. No.: WO2015/195159
PCT Pub. Date: Dec. 23, 2015

(65) Prior Publication Data
US 2017/0222918 A1 Aug. 3, 2017

(30) Foreign Application Priority Data
Jun. 18, 2014 (IN) ............... 2974/CHE/2014

(51) Int. Cl.
*H04L 12/24* (2006.01)
*H04L 12/26* (2006.01)
(Continued)

(52) U.S. Cl.
CPC .......... *H04L 45/38* (2013.01); *H04L 12/6418* (2013.01); *H04L 41/20* (2013.01);
(Continued)

(58) Field of Classification Search
CPC ......... H04L 45/38; H04L 41/20; H04L 43/16; H04L 45/56; H04L 47/24; H04L 49/25
(Continued)

(56) References Cited

U.S. PATENT DOCUMENTS 7,990,946 B2 8/2011 Deguhi
8,339,988 B2 12/2012 Taylor et al.
(Continued)

OTHER PUBLICATIONS

Gautam Khetrapal and Saurabh Kumar Sharma, "Demystifying Routing Services in Software-Defined Networking," Oct. 25, 2013, pp. 1-12, Aricent Group, Available at: <aricent.com/sites/default/files/pdfs/Aricent-Demystifying-Routing-Services-SDN-Whitepaper.pdf>.
(Continued)

*Primary Examiner* — Christopher R Crompton
(74) *Attorney, Agent, or Firm* — Hewlett Packard Enterprise Patent Department

(57) ABSTRACT

Methods, systems, and storage mediums that can allow for automatic re-routing of network traffic in software-defined networks. In some examples, instructions can be provided to network switches in a software-defined network to initially route network traffic along a first flow route. The instructions can further instruct the network switches to automatically re-route the network traffic along a second flow route at a later time.

15 Claims, 5 Drawing Sheets

(51) Int. Cl.
*H04L 12/64* (2006.01)
*H04L 12/721* (2013.01)
*H04L 12/771* (2013.01)
*H04L 12/851* (2013.01)
*H04L 12/947* (2013.01)

(52) U.S. Cl.
CPC .............. *H04L 43/16* (2013.01); *H04L 45/56* (2013.01); *H04L 47/24* (2013.01); *H04L 49/25* (2013.01)

(58) Field of Classification Search
USPC .......................................................... 370/400
See application file for complete search history.

(56) References Cited

U.S. PATENT DOCUMENTS

| | | |
|---|---|---|
| 8,670,310 B2 | 3/2014 | Sharma et al. |
| 2003/0021222 A1 | 1/2003 | De Boer et al. |
| 2006/0248369 A1 | 11/2006 | Kumazawa et al. |
| 2011/0096668 A1* | 4/2011 | Bloch .................... H04L 45/38 370/237 |
| 2011/0261723 A1 | 10/2011 | Yamato et al. |
| 2013/0028070 A1 | 1/2013 | Beheshti-Zavareh et al. |
| 2013/0094354 A1 | 4/2013 | Taylor et al. |
| 2013/0329548 A1 | 12/2013 | Nakil et al. |
| 2013/0329601 A1 | 12/2013 | Yin et al. |

OTHER PUBLICATIONS

International Search Report and Written Opinion, International Application No. PCT/US2014/063195, dated Feb. 13, 2015, pp. 1-7, KIPO.

Jason Edelman, "OpenFlow, vPath and SDN," Apr. 11, 2013, pp. 1-3, Jason Edelman's Blog, Available at: <jedelman.com/1/post/2013/04/openflow-vpath-and-sdn.html>.

* cited by examiner

AUTOMATIC RE-ROUTING OF NETWORK TRAFFIC IN A SOFTWARE-DEFINED NETWORK

BACKGROUND

Software-defined networking is an approach to computer networking in which control decisions for routing traffic through the network can be decoupled from the network's physical infrastructure. In some software-defined networks, a network controller can instruct switches in the network to flow traffic along a selected routing path. The routing path can be selected by the network controller, administrator, or another entity based on network conditions or other factors. For example, a routing path can be selected so as to improve network efficiency, to achieve a desired load balancing, or to achieve other desired characteristics in the network.

DETAILED DESCRIPTION

Figure 1:
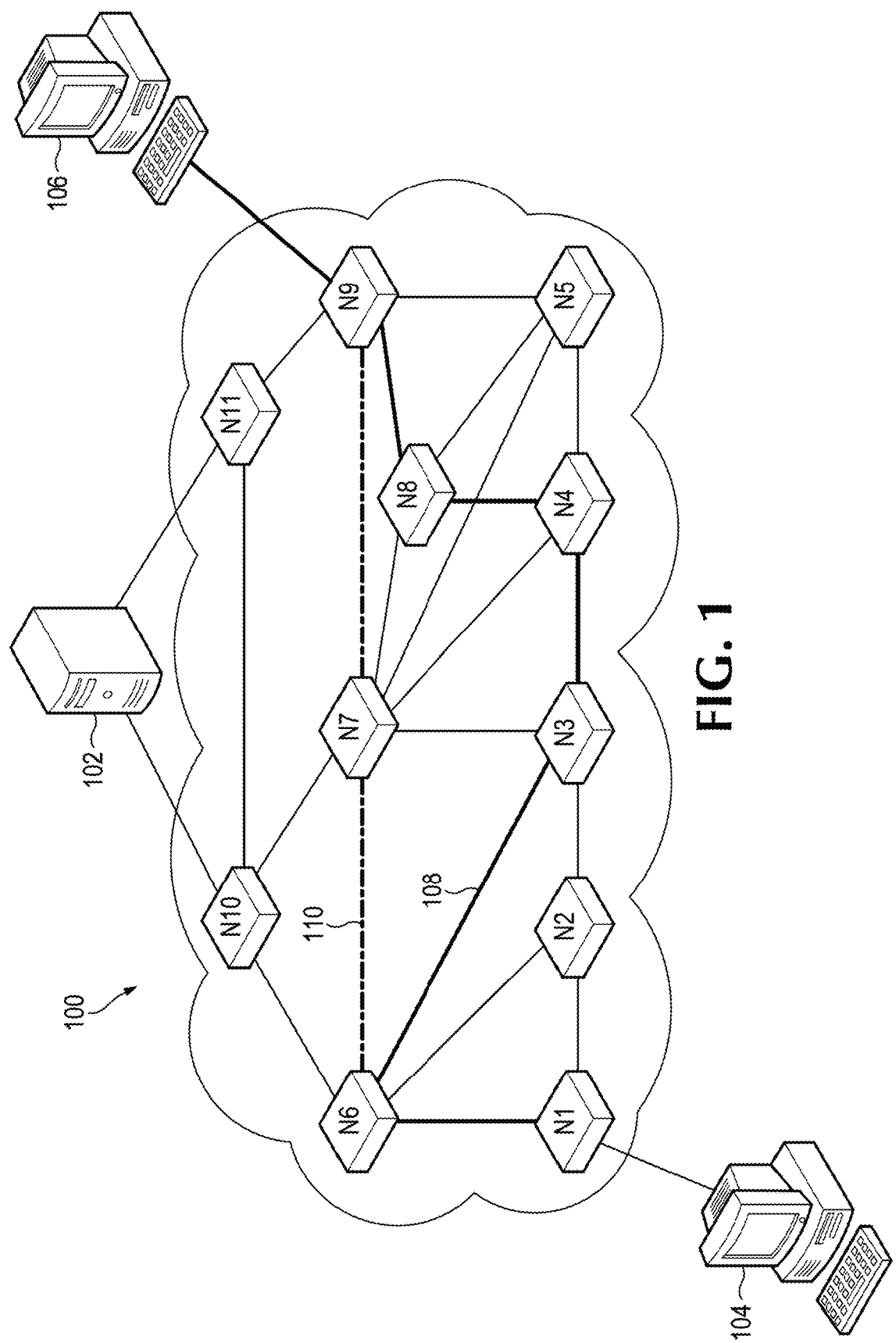
FIG. 1 is a diagram of a software-defined network that depicts several potential flow routes between a source node and a destination node, according to an example.

Network traffic is often subject to quality-of-service ("QoS") guarantees, which can help ensure that network resources are used efficiently for multiple applications and services. For example, QoS guarantees can relate to acceptable bandwidths, latencies, error rates, jitter rates, and the like. QoS guarantees are often implemented to ensure a quality experience when using time-sensitive network services, such as real-time multimedia services including Internet Protocol television (IPTV), video calls, online gaming, security camera streams, Voice over IP (VoIP) traffic, or other services.

In order to comply with QoS guarantees in a software-defined network (SDN), a network controller can be used to monitor the network's performance and make adjustments to the routing of QoS traffic. In some cases, the controller may choose not to select an otherwise more desirable route because that route is unable to currently meet QoS guidelines. For example, in some cases, the time to install routing instructions on one or more network switches in a generally more desirable path may be longer than the time to install routing instructions on one or more switches in a generally less desirable path. The installation time difference could have impact the network's ability to meet the QoS guarantees.

To avoid selecting an overall less optimal path based on unrepresentative initial network conditions, the network controller can be configured to continuously monitor the network conditions of each switch to determine whether the network traffic should be re-routed. However, such continuous monitoring can create an unpredictable and undue load on the controller.

In an example, a method can include choosing an initial fast-installing route for network traffic in order to meet QoS guarantees, while providing further instructions to automatically schedule the traffic to be re-routed along a slow-installing but otherwise better route at a time at which all the switches in the slow-installing route are installed. Similarly, in situations where the controller is able to predict that unusually high traffic along a second route is going to end at a given time, the controller can provide instructions to automatically re-route the flow to the second route when that time elapses. It is appreciated that a determination that one path is "better" than another path can be based on numerous factors, such as factors relating to QoS guarantees. For example, a given path can be determined to be "better" than another path because it provides or is predicted to provide one or more of the following: greater throughput, lower latencies, error, or jitter rates, etc. It is further appreciated that a given flow route can be determined to be "better" based on other factors, such as a preference of a network administrator. Moreover, it is appreciated that the solutions described herein can be implemented for routing network traffic subject to QoS guarantees as well as network traffic that is not subject to such guarantees.

The techniques described herein can be advantageous compared to existing methods for route selection in an SDN. For example, in some implementations, the controller can select a better path for QoS traffic, even if there is a slow-programmable switch in that path. In some implementations, the better path can also be used as soon as possible when the path completes installation. In some implementations, the determination of flow instructions is done once in the controller without continuous monitoring of the installation status or traffic load on each switch. In some implementations, the load on the controller is reduced as there is no pending activity once the path is calculated. In some implementations, traffic tuning can be performed and a path can be set up to be ready for any particular start time. In some implementations, the network will benefit from greater predictability as there will be only one path existing for a particular flow at any single instance of time. Other advantages of the solutions presented herein will be apparent upon review of the description and figures.

FIG. 1 depicts a network 100 that is implemented as an SDN and includes a network controller 102 and programmable switches N1-N10 that together allow controller 102 to route network traffic from a source node 104 to a destination node 106 in network 100. As described further herein, controller 102 can, for example, interface with switches N1-N10 via a suitable Application Program Interface ("API"), such as QoS APIs, or another suitable protocol (e.g., OpenFlow and/or simple network management protocol (SNMP)). As described further with respect to FIG. 5, which illustrates one example of controller 102 for use in network 100, controller 102 can be implemented as a software program on a computer system connected to network 100.

Switches N1-N10 are provided in network 100 to route traffic from source node 104 to destination node 106. Switches N1-N10 are configured to manage the flow of data across network 100 by only transmitting data to the network device for which the data is intended. As a result, in networks such as network 100, switches N1-N10 can provide multiple routing paths between source node 104 and destination node 106, such as first path/flow route 108 and second path/flow route 110. As described further with respect to FIG. 6, which illustrates one example of switch N1 for use in network 100, one or more of switches N1-N10 can be in the form of standalone network devices including their own processing and data storage unit.

Source node 104 and destination node 106 can be in the form of a network host or other network node. For example, source node 104 can be a first personal computer and destination node 106 can be a second personal computer. It is appreciated that source node 104 and destination node 106 need not be limited to end user devices, and can instead be in the form of suitable network infrastructure-type devices, such as suitable modems, hubs, network switches or the like.

As shown in FIG. 1, switches N1-N10 can form multiple flow routes between source node 104 and destination node 106. Network "traffic" or "flow" as used herein can refer to an aggregation of data packets between source node 104 and destination node 106 in network 100. A network flow may be a subset of another flow and may be bidirectional or unidirectional. A single flow may be disaggregated into multiple flows, and conversely, multiple flows may be aggregated into a single flow.

Switches N1-N10 in network 100 can receive a data packet of a flow at one of the switch's ports and can determine flow specifications for the packet by extracting certain header fields and other meta-information from the packet. For example, the packet can identify any QoS guarantees for the flow. With reference to switch N6 in FIG. 1, the flow entry can, for example, include information such that when a packet arrives at switch N6 to forward the packet to a first switch or to a second, different, switch based on the flow entry.

In the example depicted in FIG. 1, first flow route 108 passes from source node 104 to destination node 106 by way of switches N1, N6, N3, N4, N8, and N9. Second flow route 110 passes from source node 104 to destination node 106 by way of switches N1, N6, N7, and N9. In this example, first flow route 108 is a low-bandwidth path that contains only fast-installing switches, whereas second flow route 110 is a high-bandwidth path that contains a slow-installing switch N7. With reference to these example flow routes, various methods, systems, and techniques are described herein to route traffic within network 100 so as to comply with QoS guarantees while achieving other desired network conditions, such as increased data throughput or the like.

Figure 2:
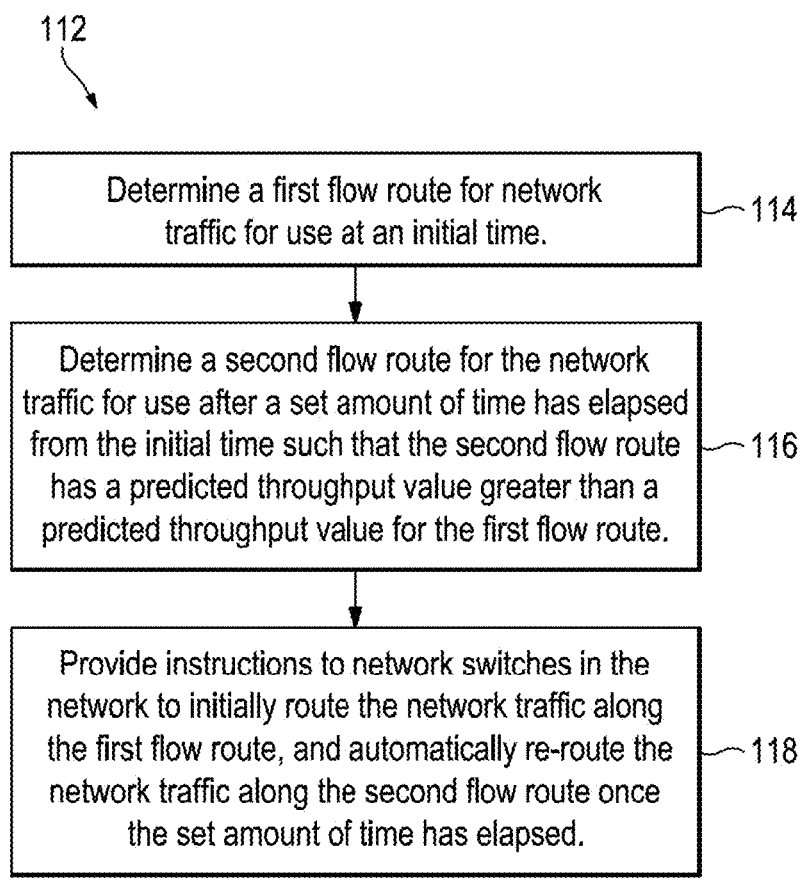
FIG. 2 is a flowchart of an improved method for routing network traffic in a software-defined network, according to an example.

FIG. 2 illustrates an example of a method 112 that can be implemented in a network controller for routing network traffic between a source node and a destination node in a network. For illustration, the description of method 112 refers to elements of network 100, however, it is appreciated that method 112 can be implemented in any suitable SDN with any number or arrangement of network devices.

Method 112 includes a step 114 of determining, with controller 102, a first flow route for network traffic for use at an initial time. In the example network 100 depicted in FIG. 1, such a first flow route is labelled as first flow route 108 and passes from source node 104 to destination node 106 by way of switches N1, N6, N7, and N9. The "initial time" considered by controller 102 in step 114 can correspond to a time immediately after controller 102 determines the first flow route or can correspond to another time in the future. Controller 102 can be used to determine the initial time based on information provided by network devices within network 100 or other sources. An initial time value can also be determined by another entity or entities and provided to controller 102. For example, in some implementations, a network administrator can provide an initial time value to controller 102.

First flow route 108 has a first predicted throughput value based on characteristics of network 100. The throughput value can, for example, be related to a rate of successful message delivery between source node 104 and destination node 106 over the flow route. The predicted throughput value can, for example, be in the form of bits per second (bit/s or bps), data packets per second, or another suitable unit.

Controller 102 can be used to determine the first predicted throughput value based on information provided by network devices within network 100 or other sources. The first predicted throughput value can also be determined by another entity or entities and provided to controller 102. For example, a network administrator can provide the first predicted throughput value to controller 102.

Step 114 can, for example, include determining a first flow route that allows the network traffic to flow immediately after the initial time. For example, because flow route 110 in this example contains a slow-installing switch (switch N7), controller 102 can select another route, such as flow route 108, that does not include a slow-installing switch so as to allow the network traffic to flow immediately after the initial time.

Method 112 includes a step 116 of determining a second flow route for the network traffic for use after a set amount of time has elapsed from the initial time such that the second flow route has a second predicted throughput value that is greater than the first predicted throughput value so as to make it advantageous to re-route the traffic. In the example network 100 depicted in FIG. 1, such a second flow route is labelled as second flow route 110 and passes from source node 104 to destination node 106 through switches N1, N6, N3, N4, N8, and N9.

Similar to the first predicted throughput value of first flow route 108, the second predicted throughput value of second flow route 110 can, for example, be determined by controller 102 or can be determined by another entity or entities and provided to controller 102. For example, a network administrator can provide the second predicted throughput value to controller 102. Step 116 can, for example, include determining a second flow route that is predicted to allow the network traffic to flow after the set amount of time has elapsed.

The "set amount of time" considered by controller 102 in step 116 can, for example, correspond to the largest installing time among the installing times for each switch along the second flow route. The installing times for each switch in a given flow route can depend on a variety of factors such as the number of devices in the control plane, load on the switch, capabilities of the switch, flow table size, as well as other factors.

When installing times are considered by controller 102, controller 102 can in some cases receive, from each switch in the network, information identifying the installing time for the switch. Alternatively or in addition, information identifying the installing time for the switch can be provided through a source other than the switch itself, such as for example a network administrator or another device in the network. In some implementations, the "set amount of time" considered by controller 102 in step 116 can, for example, correspond to a time at which the throughput of the second flow route is predicted to be greater than the throughput of the first flow route.

Method 112 includes a step 118 of providing instructions to network switches in the network. The instructions can, for example, be provided to every network switch controlled by controller 102 or only to relevant controlled network switches for a given flow route. The instructions are executable by the network switches to initially route the network traffic along the first flow route 108. The instructions are further executable by the network switches to automatically re-route the network traffic along the second flow route 110 once the set amount of time has elapsed. For example, the network switches can be instructed to automatically re-route when the set amount of time elapses or at a time after the set amount of time elapses.

In order to implement the instructions of controller 102, network 100 can use a communication protocol designed for control of SDNs, such as the OpenFlow communication protocol ("OpenFlow"). Using OpenFlow, controller 102 can provide instructions to a switch in the form of a flow that includes flow entries describing how the switch should forward certain types of packets. The flow entry can, for example, include information such that when a prioritized Quality of Service (QoS) packet arrives at the switch en route to a destination to forward the packet to a first switch, whereas when a non-prioritized packet arrives at the switch to forward the packet to a second switch. For example, controller 102 can instruct switches to route network traffic that is highly sensitive to latency along a first path and to route network traffic that is not as highly sensitive to latency along a second path. When a switch receives a packet for which it does not already have a flow entry, the switch can forward the packet to controller 102 for instructions.

Controller 102 can provide instructions to a switch in the form of a single communication or in the form of multiple communications. For example, the instructions to initially route the network traffic along the first routing path can be provided to a switch at the same time as the instructions to schedule the network traffic to be automatically re-routed along the second routing path. Alternatively or in addition, these instructions can be broken up into several sets of instructions, with a first set of instructions being provided to the switch at a first time and a second set of instructions being provided at a later time. As but one example, controller 102 can provide the instructions relating to initially routing the network traffic along the first flow route before or after providing the instructions for automatically re-routing the network traffic along the second flow route.

Along with instructions for forwarding the packet, controller 102 can further provide an idle or inactivity timeout as well as a hard timeout so as to keep updated flow entries in every switch for active traffic. For example, controller 102 may place a timeout or expiration on a flow rule, after which the switch would have to contact controller 102 on a first packet of each flow until it gets a new flow rule from controller 102. Timeout values can be calculated based on historical information for network use, or on other information. Controller 102 can be used to determine the timeout values. Timeout values can also be determined by another entity or entities and provided to controller 102. For example, a network administrator can provide timeout values to controller 102.

One or more switches in network 100 can be configured to automatically start flow along second flow route 110 when flow along first flow route 108 is stopped. For example, a controller can assign a higher priority for flow route instructions corresponding to first flow route 108 and a lower priority for flow route instructions corresponding to second flow route 110 such that when flow along first flow route 108 is timed out, the flow route will be automatically re-routed to second flow route 110 in accordance with priority rules.

The controller can further provide start time instructions to the switches for when a flow should be started. For example, a timer value can be provided to a switch such that once a flow is installed with a start-time, the flow will be in effect only after the start time. For example, for a switch (such as switch N6) that bridges first flow route 108 and second flow route 110, instructions relating to flowing traffic along first flow route 108 can be installed with no start time value, but with a hard timeout equal to the installing time for second flow route 110. Instructions relating to flowing traffic along second flow route 110 can be installed with a start-time that corresponds to the installing time of second flow route 110.

Figure 3:
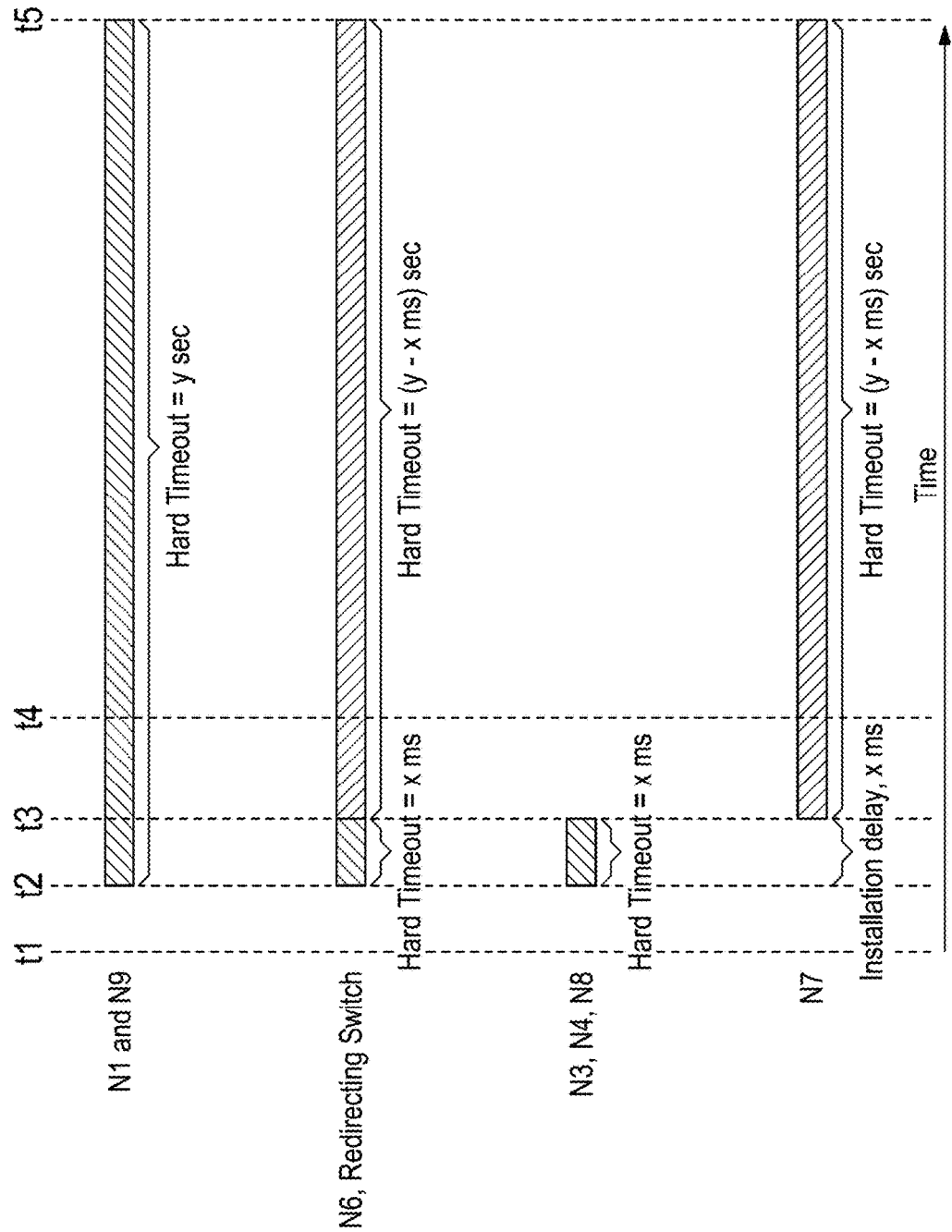
FIG. 3 is a timeline depicting switch activity when traffic is switched between a first flow route and a second flow route within the software-defined network of FIG. 1, according to an example.

FIG. 3 illustrates a timeline depicting switch activity for switch N3-N4 and N6-N9 when traffic is automatically re-routed from first path 108 to second path 110 after all the switches in second path 110 are installed. Between t1 and t2, all of the switches are in the process of installing. At t2, all of the switches except for N7 have completed installation. At t3, N7 has completed its installation. In some examples, N6 is instructed to switch its flow direction at t3 so as to pass through N7 along second path 110. In this example, N3, N4, and N8 are provided with flow instructions to time out at t3 because second path 110 does not pass through these switches. As an alternative, N6 may be instructed to switch its flow direction at a time t4 that is after t3 (i.e., after N7 has completed its installation). In such an example, N3, N4, and N8 would be provided flow instructions to time out at t4. At t5, all of the relevant switches are subject to a hard timeout. As indicated in FIG. 3, N1 and N9 do not change their flow direction because these switches always forward data to the same node in network 100 regardless of whether first path 108 or second path 110 is used. That is, N1 will forward to N6 in both route paths and N9 will forward to destination node 106 in both route paths.

Figure 4:
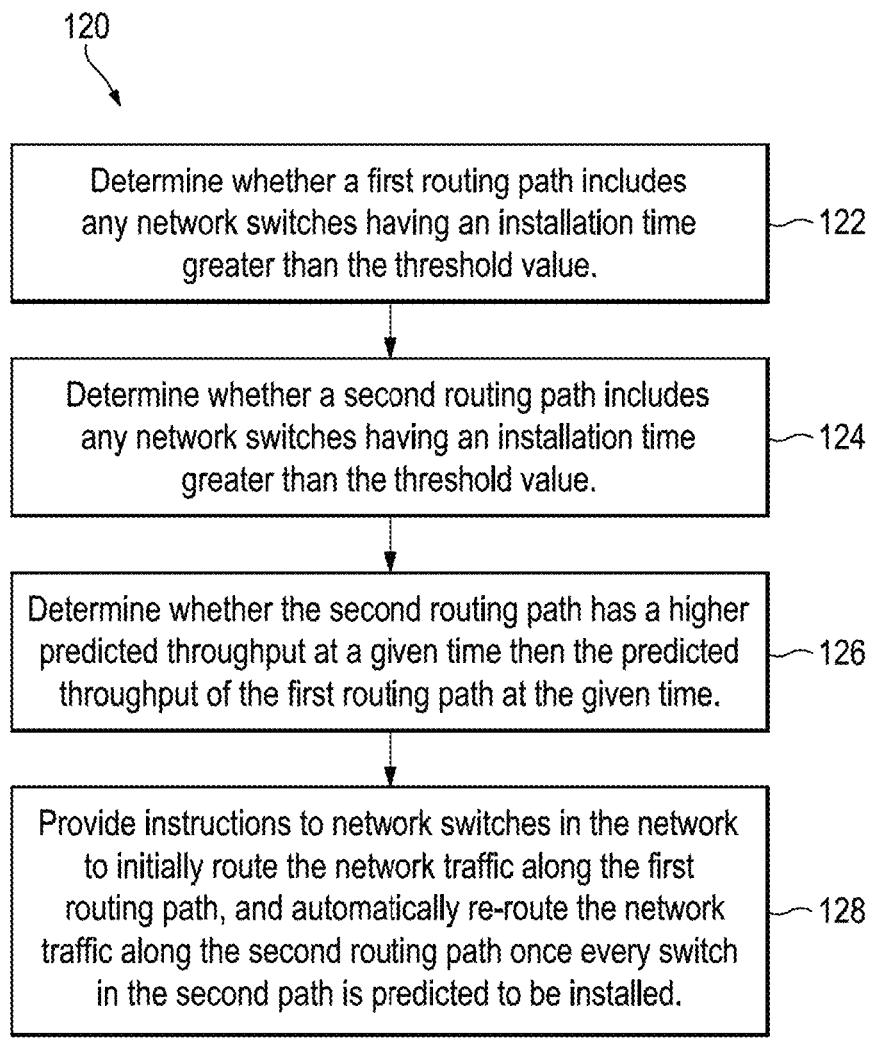
FIG. 4 is a flowchart of another improved method for routing network traffic in a software-defined network, according to an example.

FIG. 4 illustrates another example of a method 120 that can be implemented in a network controller for routing network traffic between a source node and a destination node in an SDN. For clarity, the description of method 120 refers to elements of network 100, however, it is appreciated that method 120 can be implemented in any suitable SDN with any number or arrangement of network devices.

Method 120 includes a step 122 of determining whether a first routing path includes any network switches having an installing time greater than a threshold value. The threshold value can, for example, be less than an allowable time lag for the network traffic. The allowable time lag can be determined based on QoS guarantees for the traffic. Controller 102 can be used to determine the allowable time lag, or in some examples, the allowable time lag can be determined by another entity or entities and provided to controller 102. For example, a network administrator can provide the allowable time lag to controller 102. As described above with respect to method 112, the installing time of the network switches can be determined by controller 102 or can be provided to controller 102.

Method 120 includes a step 124 of determining with controller 102 whether a second routing path includes any network switches having an installing time greater than the threshold value. Method 120 includes a step 126 of determining whether the second routing path has a higher predicted throughput at a given time than the first routing path at the given time. The given time can, for example, be a time at which all of the switches in the first and second paths are predicted to be installed. The given time can, for example, be the moment when the last--installing switch is predicted to be installed, or a time after the last-installing switch is predicted to be installed.

The first routing path can, for example, be determined to be the routing path that has the highest throughput among a fast-installing set of routing paths each of which contains only switches with installing times less than or approximately equal to the threshold value. The second routing path can, for example, be determined to be the routing path that has the highest throughput among a slow-installing set of routing paths each of which contains a network switch with an installing time greater than the threshold value.

Method 120 includes a step 128 of providing certain routing instructions to network switches, the instructions being executable by the switches to initially route the network traffic along the first routing path, and automatically re--route the network traffic along the second routing path at a time at which every switch in the second path is predicted to be installed. These instructions are provided when it is determined that: (a) the first routing path includes no network switches having an installing time greater than a threshold value, (b) the second routing path includes a network switch having an installing time greater than the threshold value, and (c) the second routing path has a higher predicted throughput than the first routing path.

Step 128 can include determining a timeout value corresponding to the largest installing time among installing times for each switch in the second routing path. Step 128 can include providing instructions to stop flow along the first routing path at the timeout value and to then start flow along the second routing path. In some examples, step 128 can include providing instructions to start flow along the second routing path at a given start time.

Figure 5:
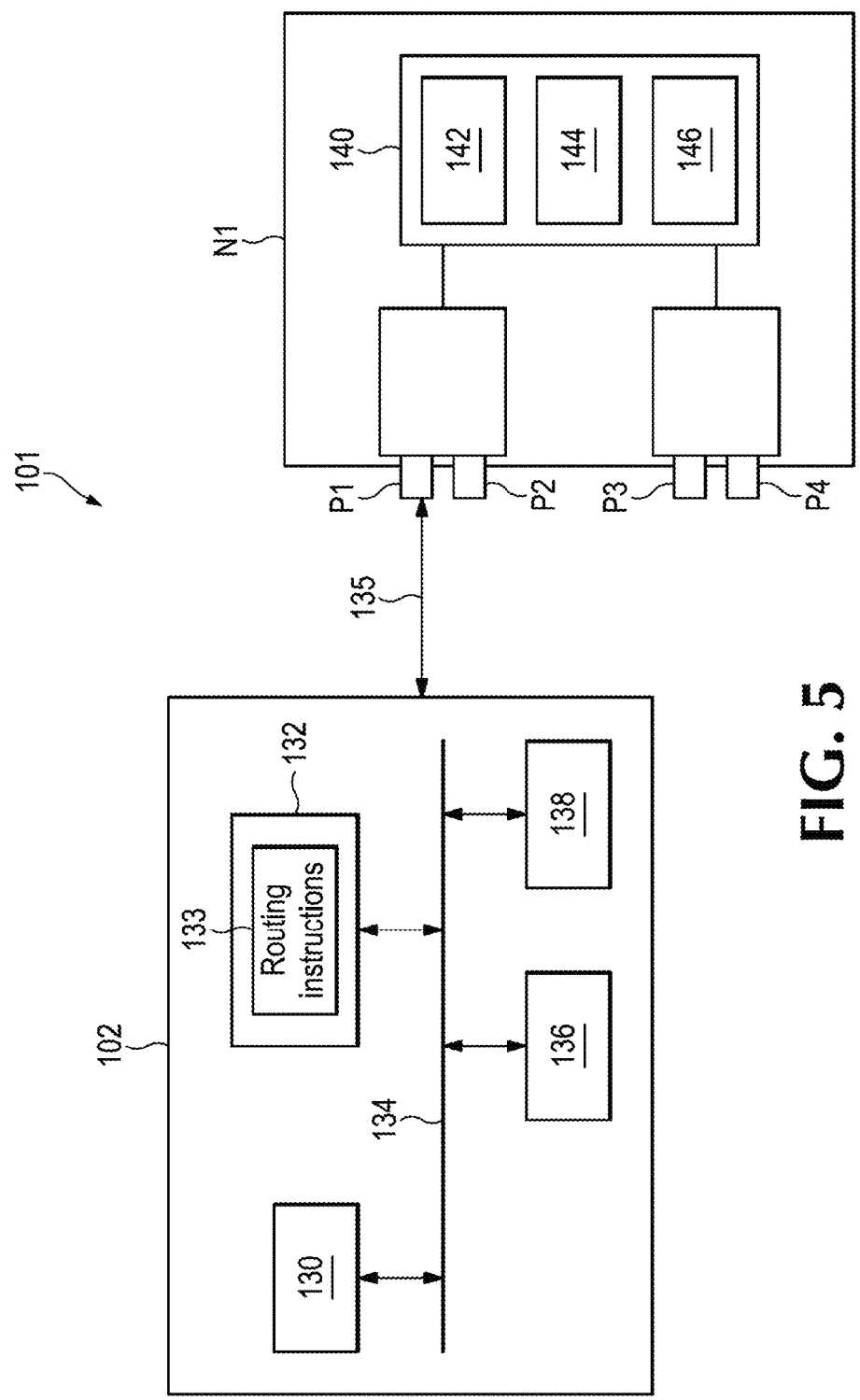
FIG. 5 is a block diagram of a system including a controller connected to a switch, according to an example.

FIG. 5 shows an example block diagram for a system 101 depicting controller 102 connected to switch N1 via link 135. As depicted in FIG. 5, controller 102 may be implemented as part of a computer system including a processor 130, data storage module 132, communication bus 134, I/O devices 136, and communication interface 138. Data storage module 132 includes instructions 133 that enable controller 102 to execute one or more computer programs performing the methods, steps and functions for controller 102 described herein. For example, instructions 133 can enable controller 102 to execute method 112 or method 120.

Processor 130 can, for example, provide an execution platform for executing software. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 130 may include a processing module that can fetch, decode, and execute instructions stored on a storage medium to implement the functionalities described herein.

Data storage module 132 can be in the form of a machine-readable storage medium, which can include any electronic, magnetic, optical, or other physical storage apparatus to contain or store information such as executable instructions, data, and the like. As used herein, a "machine-readable storage medium" may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory. In some implementations, data storage module 132 can include a main memory, such as a Random Access Memory (RAM), where software may reside during runtime, and a secondary memory. The secondary memory can, for example, include a nonvolatile memory where a copy of software is stored.

I/O devices 136 can include a display and/or user interfaces comprising one or more input/output devices for communicating with controller 102. Such input/output devices can, for example, include a keyboard, mouse, stylus, touchscreen, speaker, monitor, etc. Communication interface 138 is provided for communicating with other components. Communication interface 138 can be implemented for use as a wired or wireless communication interface. Communication interface 138 can, for example, be a network interface.

Switch N1 can include multiple ports P1-P4 and a switch chassis 140 that work together to allow switch N1 to forward network traffic to a network device connected to switch N1. Ports P1-P4 can be used for receiving and sending data in network 100. It is appreciated that switches P1-P4 can include wired connections to other network devices in network 100, such as to link 135, or elsewhere or can be in the form of virtual ports that wirelessly transmit data. Switch chassis 140 can include a processor 142, a data storage module 144, and a switch fabric 146. Switch fabric 146 may include a high-speed transmission medium for routing packets between ports P1-P4 internally within switch N1.

Processor 142 of switch N1 can include a processing module that operates to extract a set of fields from a received data packet to allow switch N1 to determine flow routing instructions.

Data storage module 144 may include a main memory, such as a Random Access Memory ("RAM"), where software may reside during runtime. Data storage module 132 may also include a secondary memory. The secondary memory may include, for example, a non-volatile memory where a copy of software may be stored. In one example, the secondary memory may include a Read Only Memory ("ROM"), an Erasable, Programmable ROM ("EPROM"), an Electrically Erasable, Programmable ROM ("EEPROM"), and/or any other data storage device, including hard disks.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations. As but one example, data storage module 132 of controller 102 can include aspects of data storage module 144 of controller 102 and vice versa.

Furthermore, it should be understood that the systems, apparatuses, and methods described herein can include various combinations and/or sub-combinations of the components and/or features of the different implementations described. Thus, features described with reference to one or more implementations can be combined with other implementations described herein.

Although FIG. 1 depicts a certain number of hosts, switches, and a single network controller, it is appreciated that the disclosure herein can be adapted to a network including more or fewer hosts, switches, controllers, or other suitable network devices. The term "network devices" as used herein can include any device that can connect to an SDN, such as, for example, hosts, controllers, switches, gateways, or computer systems connected to the network (e.g., servers or end-user devices). It is further appreciated that the functions of one or more network devices in an SDN can be replicated split among multiple devices within or otherwise connected to the network. As but one example, the functions of controller 102 may be split among multiple controllers throughout network 100. For example, in some implementations, controller 102 can be implemented as a standalone network device in network 100. Alternatively or in addition, controller 102 can be implemented within another network device in network 100, such as within a host, switch, gateway, etc.

As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory arid executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules.

Moreover, the term "provide" as used herein includes push mechanisms (e.g., sending data independent of a request for that data), pull mechanisms (e.g., delivering data in response to a request for that data), and store mechanisms (e.g., storing data at an intermediary at which the data can be accessed). Furthermore, as used herein, the term "based on" means "based at least in part on." Thus, a feature that is described based on some cause, can be based only on the cause, or based on that cause and on one or more other causes.

Although the flowchart of FIGS. 2 and 4 show a specific order of performance of functionalities of methods 112 and 120, these methods are not limited to that order. For example, the functionalities shown in succession in the flowchart may be performed in a different order, may be executed concurrently or with partial concurrence, or a combination thereof.

What is claimed is:

1. A method implemented in a software-defined network (SDN) controller for routing network traffic between a source and a destination in the network, the method comprising:
   determining a first flow route for the network traffic for use at an initial time, the first flow route having a first predicted throughput value;
   determining a second flow route for the network traffic for use after a set amount of time has elapsed from the initial time such that the second flow route has a second predicted throughput value that is greater than the first predicted throughput value; and
   providing instructions to network switches in the network, the instructions being executable by the network switches to:
   initially route the network traffic along the first flow route, and automatically re-route the network traffic along the second flow route once the set amount of time has elapsed.

2. The method of claim 1, wherein the step of determining the first flow route includes determining a flow route that is predicted to allow the network traffic to flow immediately after the initial time, and
   wherein the step of determining the second flow route includes determining a flow route that is predicted to allow the network traffic to flow after the set amount of time has elapsed.

3. The method of claim 1, wherein the set amount of time corresponds to a largest installing time among installing times for each switch in the second flow route.

4. The method of claim 1, further comprising:
   receiving, from each switch in the network, information identifying an installing time for the switch.

5. The method of claim 1, wherein the set amount of time corresponds to a time at which the throughput of the second flow route is predicted to be greater than the throughput of the first flow route.

6. The method of claim 1,
   wherein the switches in the network are configured to automatically start flow along the second flow route when flow along the first flow route is stopped, and
   wherein the instructions provided to the switches in the network include a timeout value for stopping flow along the first flow route, the timeout value being approximately equal to the set amount of time.

7. The method of claim 1, wherein the instructions provided to the switches in the network include:
   a timeout value for stopping flow along the first flow route, the timeout value being approximately equal to the set amount of time; and
   a start value for starting flow along the second flow route, the start value being approximately equal to the set amount of time.

8. The method of claim 1, wherein the network traffic is prioritized QoS network traffic corresponding to Voice over IP (VoIP) traffic.

9. A system for routing network traffic through a software-defined network (SDN), the system comprising:
   a network controller to:
   determine whether a first routing path includes any network switches having an installing time greater than a threshold value;
   determine whether a second routing path includes any network switches having an installing time greater than the threshold value;
   determine whether the second routing path has a higher predicted throughput at a given time than the predicted throughput of the first routing path at the given time; and
   when it is determined that: (a) the first routing path includes no network switches having an installing time greater than a threshold value, (b) the second routing path includes a network switch having an installing time greater than the threshold value, and (c) the second routing path has a higher predicted throughput than the first routing path, provide instructions to network switches in the network, the instructions being executable by the switches to:
   initially route the network traffic along the first routing path, and
   automatically re-route the network traffic along the second routing path at a time at which every switch in the second path is predicted to be installed.

10. The system of claim 9, wherein the threshold value is less than an allowable time lag for the network traffic.

11. The system of claim 9,
wherein the network controller is configured to determine the first routing path to be the routing path that has the highest throughput among a fast-installing set of routing paths each of which contains only switches with installing times less than or approximately equal to the threshold value, and
wherein the network controller is configured to determine the second routing path to be the routing path that has the highest throughput among a slow-installing set of routing paths each of which contains a network switch with an installing time greater than the threshold value.

12. The system of claim 9, wherein the network controller is configured to determine a timeout value corresponding to the largest installing time among installing times for each switch in the second routing path.

13. The system of claim 12, wherein the network controller is configured to provide instructions to switches in the network to stop flow along the first routing path at the first timeout value and to then start flow along the second routing path.

14. The system of claim 9, wherein the network controller is configured to provide instructions to initially route the network traffic along the first routing path at the same time it provides instructions to schedule the network traffic to be automatically re-routed along the second routing path.

15. A non-transitory machine-readable storage medium encoded with instructions executable by a processor, the machine-readable storage medium comprising:
instructions for determining a first flow route of a software defined network (SDN) for use at an initial time, the first flow route having a first predicted throughput value;
instructions for determining a second flow route of the SDN for use after a set amount of time has elapsed from the initial time such that the second flow route has a second predicted throughput value that is greater than the first predicted throughput value;
instructions for controlling network switches of the SDN to initially route network traffic between a source and a destination in the SDN along the first flow route in which every network switch of the first flow route is installed at an initial time; and
instructions for controlling the switches to automatically re-route the network traffic along the second flow route after the set amount of time after the initial time and after which every switch of the second flow is predicted to be installed.

* * * * *